United States Patent [19]

Hearn

[11] 3,995,713
[45] Dec. 7, 1976

[54] HIGH SPEED SEISMIC GAS EXPLODER AND METHOD OF OPERATION

[75] Inventor: Daniel P. Hearn, Richardson, Tex.
[73] Assignee: Atlantic Richfield Company, Los Angeles, Calif.
[22] Filed: Nov. 25, 1974
[21] Appl. No.: 526,842
[52] U.S. Cl. .............................. 181/119; 181/114; 181/116; 181/401; 340/17 R
[51] Int. Cl.² ...................... G01V 1/02; G01V 1/10
[58] Field of Search .......... 181/117, 116, 114, 119, 181/401; 340/17

[56] References Cited
UNITED STATES PATENTS

| | | | |
|---|---|---|---|
| 3,474,880 | 10/1969 | Gundlach | 181/117 |
| 3,620,328 | 11/1971 | Coburn et al. | 181/114 |
| 3,810,524 | 5/1974 | Dransfield | 181/114 |

Primary Examiner—Nelson Moskowitz
Attorney, Agent, or Firm—Robert M. Betz

[57] ABSTRACT

A gas exploder for injecting seismic signals into the earth is provided with a high speed hydraulic catching apparatus which allows the exploder to rebound essentially unrestrained after it is fired at the surface and replaces it on the ground in one second or less without generating a significant false signal. The exploder falls freely from its maximum rebound height to within a few inches of the ground and is then lowered slowly to its starting position. Means are provided for automatically adjusting the position of the exploder after each shot so that it rests on the earth ready for the next firing even though compaction of the earth has taken place.

12 Claims, 1 Drawing Figure

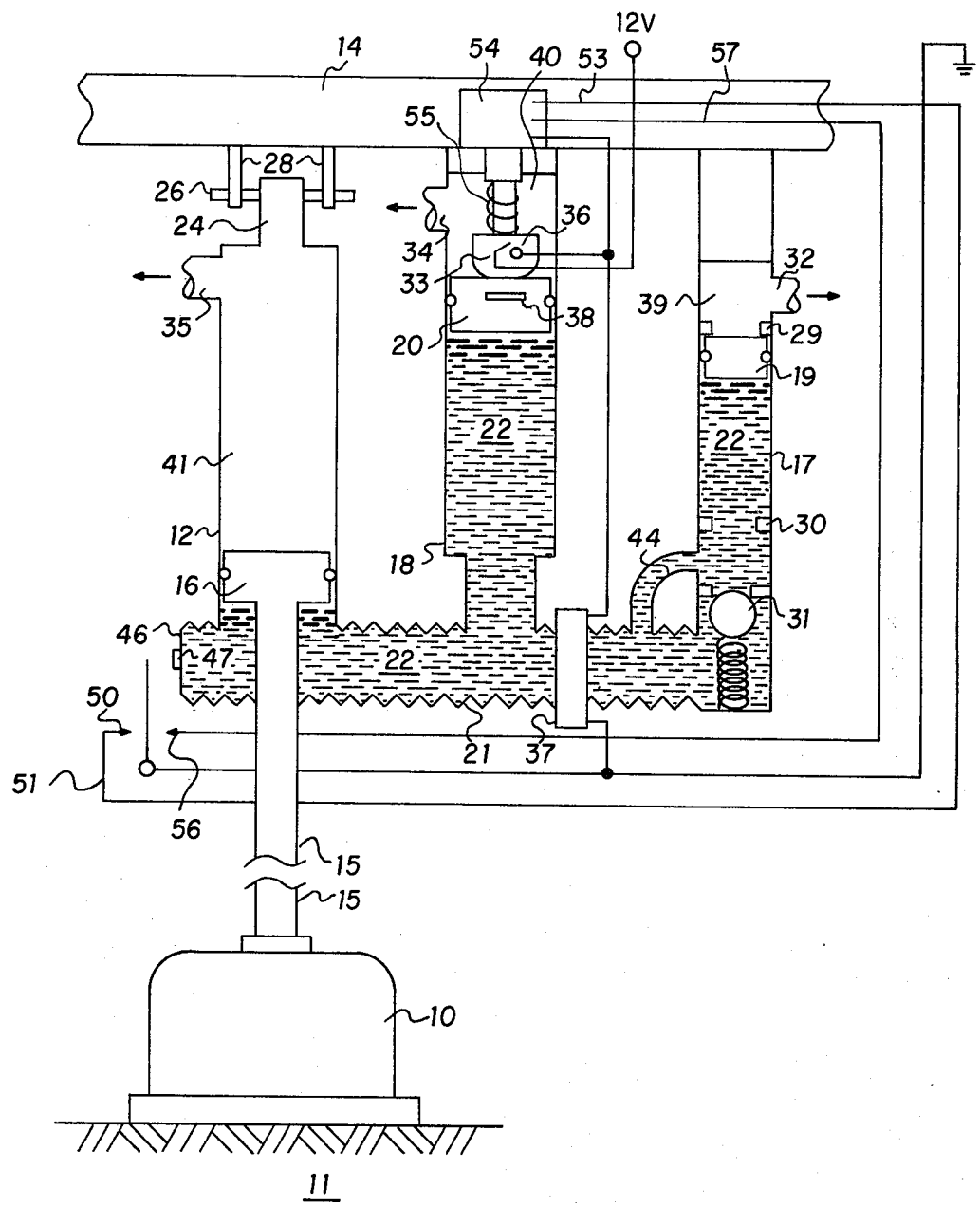

HIGH SPEED SEISMIC GAS EXPLODER AND METHOD OF OPERATION

BACKGROUND OF THE INVENTION

1. Field of the Invention

This invention relates generally to the field of geophysical prospecting and more particularly to a method and apparatus for imparting a seismic impulse to the earth's surface utilizing a high speed catching system.

2. Description of the Prior Art

The invention to be described is of primary interest in connection with the control and operation of so-called seismic gas exploders. Typically, these are devices resting on the ground wherein a gas explosion takes place within an expansible chamber formed between a bottom impact mass and a movable piston assembly, causing the impact mass to move downwardly to generate a seismic wave within the earth. The piston assembly moves in an opposite direction, followed by the upward rebound of the entire exploder housing. If the exploder is allowed to fall back to earth under the force of gravity, a secondary signal will be generated upon the subsequent impact which will interfere with the reflection of the original impulse. Thus, it is desirable either to eliminate this secondary signal or to at least minimize its amplitude.

Prior art catcher systems are adapted to allow the gas exploder to rise freely to the top of its rebound and then restrain its return to the earth. This type of catcher sequence may be performed with the aid of at least one upstanding fluid filled hydraulic cylinder provided with a piston to form a dashpot which is suitably coupled to the gas exploder. See, for example, U.S. Pat. No. 3,810,524 to Clifford D. Dransfield. In this type of device, upward movement of the exploder is adapted to move the piston freely until the exploder reaches its maximum rebound height, while reversal of direction of the exploder closes a unidirectional check valve in the piston so that thereafter hydraulic fluid must bypass the piston through one or more metering holes or orifices. The result is that the entire descent of the exploder is slowed, and no significant secondary signal is produced.

Prior art catcher systems as described have been designed which enable an exploder to rise to the top of its travel in about 0.3 seconds while the return to earth requies about 3.0 seconds. It is desirable, however, particularly in repetitive operation of the exploder, such as in the generation of a rapid coded sequnce of seismic pulses, to reduce the replacement time of a gas exploder to one second or less provided this can be accomplished without generating false signals.

A further problem in the operation of prior art seismic exploders lies in the fact that an exploder may be fired when it is not in contact with the earth. Many exploders cannot withstand this stress safely. Furthermore, the resultant seismic pulse may differ substantially from one generated when the exploder interfaces the earth. For example, in repetitive operation of an exploder, the earth may be compacted and consequently lowered in level to some extent by the impact of a shot. An automatic timing sequence for firing such a gas exploder at intervals may not take account of such variations. Thus, there is a need to insure that the exploder has returned to earth so that such firing does not occur prematurely. Applicant's copending application Ser. No. 526,841 entitled METHOD AND APPARATUS FOR SENSING WHEN A SEISMIC GAS EXPLODER IS IN CONTACT WITH THE EARTH, and incorporated by reference herewith, is directed to one solution of this problem.

SUMMARY OF THE INVENTION

It is therefore a general object of this invention to provide a method and apparatus whereby a seismic gas exploder may be rapidly and safely returned to earth after its upward travel.

It is a further object of this invention to provide an improved high speed catcher system for a seismic gas exploder which enables the return of the exploder to earth without the generation of a significant false signal.

It is a still further object of this invention to provide a high speed catcher system for a seismic gas exploder designed for repetitive operation including means for automatically adjusting or indexing the position of the exploder after each shot.

It is yet another object of this invention to provide a means and method for sensing when a gas exploder is in contact with the earth.

Other objects and advantages of the method and apparatus of this invention will become apparent to those skilled in the art from a consideration of the detailed description heeinafter set forth and from the accompanying drawing and appended claims.

In accordance with a preferred embodiment of this invention, a seismic gas exploder is dependently attached to the rod of a piston movable within an upstanding hydraulic catcher cylinder suitably affixed to a supporting frame so that the cylinder and the gas exploder are in substantially axial alignment. A hydraulic fluid reservoir system is provided, including a first and second reservoir cylinder communicating with the catcher cylinder beneath the piston. As the catcher piston and gas exploder rise together after a shot, fluid empties into the catcher cylinder from the first reservoir cylinder until the catcher piston reaches an intermediate position in its upward path. The first reservoir is then isolated by a solenoid valve from the remainder of the system and fluid is thereafter supplied from a second reservoir cylinder until the exploder and catcher piston reach their maximum height. The downward excursion of the catcher piston with gravitational descent of the gas exploder expels fluid freely from the catcher cylinder into the second reservoir cylinder until the second reservoir cylinder completely refills at which point the exploder is a few inches above ground. This triggers the reopening of the solenoid valve to the first reservoir cylinder which then refills, but only through a metered bypass around a unidirectional check valve. Thus, a final portion of the descent of the gas exploder is slowed to a predetermined rate. If any part of weight of the gas exploder at rest is supported by the catcher piston, this adds to the pressure of the hydraulic fluid. Means are provided responsive to this fluid pressure for adding or removing hydraulic fluid beneath the catcher piston, which rises or falls until a predetermined percentage of the weight of the gas exploder is supported by the earth at its start position after each successive firing.

The invention also comprises a method of catching a seismic gas exploder which is adapted to rebound from the earth after imparting a downwardly directed pulse thereto comprising the steps of coupling the exploder to the piston of a hydraulic cylinder so that the piston is adapted to be driven by the rise and fall of the exploder, allowing the piston to travel essentially without restraint in one direction during the rise of the exploder to its maximum height and in an opposite direction during its subsequent fall under the influence of gravity until it reaches a predetermined distance from the earth, and thereafter hydraulically damping the further motion of the piston in said opposite direction so as to slow the remaining descent of the exploder. The method further comprises the step of controlling the rest height of the piston so that only a predetermined fraction of the weight of the gas exploder may be unsupported by the earth in its rest position.

DESCRIPTION OF THE DRAWINGS

The drawing is a representation, partly diagrammatic and partly in section, of a seismic gas exploder coupled to a high speed catching system in accordance with this invention.

DESCRIPTION OF THE PREFERRED EMBODIMENTS

In a preferred embodiment of the apparatus of this invention, a seismic gas exploder 10 resting on the ground 11 is interconnected with an upstanding hydraulic catcher cylinder 12, which is in turn affixed to a support frame 14, which may be either stationary or truck mounted. The gas exploder 10 may consist generally of any of various types adapted to impart a downwardly directed seismic pulse into the ground 11 and then rebound upwardly responsive to the reaction force. The upper surface of the gas exploder 10 is suitably fastened to the lower end of a piston rod 15 projecting downwardly from a catcher piston 16 movable within the catcher cylinder 12. Upstanding reservoir cylinders 17 and 18, provided respectively with free pistons 19 and 20, are flexibly interconnected with the catcher cylinder 12, such as by a fluid transmitting conduit 21. The conduit 21 may be formed of rubber tubing or otherwise be constructed so as to isolate the cylinders 17 and 18 from torque effects, side loads, and vibrational interference introduced by any eccentric non-vertical motion of the gas exploder 10. A quantity of hydraulic fluid 22 occupies the closed system consisting of the space in the catcher cylinder 12 below the piston 16, the respective volumes of the reservoir cylinders 17 and 18 beneath the free pistons 19 and 20, and the conduit 21. In order to enable the catcher cylinder 12 to maintain alignment with the gas exploder 10 when it is resting on uneven terrain or when it travels upwardly in a nonvertical path, the cylinder 12 may be provided with an upper sleeve 24 adapted to swivel about a bar 26 mounted on a fixed bracket 28 extending from frame 14. Cylinders 17 and 18 may be similarly mounted or be fixedly attached to frame 14 as shown.

Internally, the reservoir cylinder 17 is provided with inwardly projecting annular detents 29 and 30 positioned adjacent the upper and lower ends thereof respectively and which establish the respective upper and lower limits of the travel of the piston 19 during the operation of the hydraulic system to be described. Initially, the piston 19 will be positioned against the upper detent 29. Below the detent 30 a unidirectional ball check valve 31 is inserted in order to permit fluid to be expelled from the cylinder 17 with a small pressure. Pressure for this purpose is constantly supplied to the cylinder 17 from a suitable source (not shown) to the air space 39 above the detent 29 through a port 32.

The initial position of the free piston 20 is adjacent the upper end of the cylinder 18 and in contact with the piston stop 33 whose position may be axially raised or lowered as will become apparent from what follows. The air space 40 in the cylinder 18 above the piston 20 is vented to the atmosphere through a port 34. The air space 41 above catcher piston 16 in the catcher cylinder 12 is similarly vented to the atmosphere through a port 35.

In operation, when the gas exploder 10 is fired, it delivers a downwardly directed seismic pulse to the earth and its rebound carries the piston rod 15 and the catcher piston 16 upward within the cylinder 12 from its initial bottommost position. The constant air pressure applied within the cylinder 17 assures that there is a positive downward pressure differential on the free piston 19 relative to the free piston 20, which is subjected only to atmospheric pressure. Therefore, as the piston 16 is lifted, piston 19 descends and the hydraulic fluid 22 initially empties from the reservoir cylinder 17 through the check valve 31, and is injected into the catcher cylinder 12 to refill the space evacuated beneath the piston 16. This enables the exploder 10 to rise essentially without restraint as air escapes above the piston 16. As soon as the piston 19 reaches the lower detent 30, no more fluid 22 is expelled from the cylinder 17, piston 16 having at that time reached an intermediate position in its upward excursion. Continued upward movement of the piston 16 draws fluid 22 from the reservoir cylinder 18 into the cylinder 12, and this action continues until the gas exploder 10 reaches its maximum height. It should be understood that the conduit 21 and the interconnections therewith are large enough to supply the fluid 22 at the required rate during this part of the operating cycle.

The hollow piston stop 33 houses a magnetically operated switch 36 which is connected in the electrical circuit of the apparatus to be described. A small bar magnet 38 is embedded in the piston 20 and maintains the switch 36 in a closed position against spring bias as long as the piston 20 and the piston stop 33 are in contact with each other. A solenoid valve 37 is connected electrically in series with the magnetic switch 36, power being provided from any suitable source (not shown), for example a 12 volt battery. With the switch 36 in a closed position, the valve 37 remains open to permit fluid flow from the cylinder 17. As the cylinder 18 empties on the continued upward stroke of the piston 16, the free piston 20 rides downward on the surface of fluid 22 and consequently separates from the piston stop 33. This increases the distance between the magnet 38 and the switch 36 sufficiently to permit the switch 36 to open, which in turn closes the valve 37. The cylinder 17 is thereby isolated from the remainder of the system until the valve 37 is reopened.

When the exploder 10 reaches its maximum height and reverses direction, it falls freely under the influence of gravity. Fluid 22 is thereby forcibly expelled from the cylinder 12 so as to refill the cylinder 18 and to drive the piston 20 upward. When the piston 20 reaches the stop 33, the switch 36 again closes due to the proximity of the magnet 38, reopening the valve 37 and again permitting access to the cylinder 17. The piston 16 has at this time returned to an intermediate level within the cylinder 12. Also since the piston 20 has reached the upper limit of its travel, the cylinder 18 can accept no further fluid.

Due to the action of the ball check valve 31, the remaining fluid 22 beneath the piston 16 must reenter the cylinder 17 through a metering tube 44 bypassing the check valve 31. The diameter of the metering tube 44 may be selected so that the fluid 22 flows through it at a predetermined rate. Consequently, the exploder 10 is lowered to earth at any desired velocity. This rate has been experimentally adjusted so that the cylinder 17 fills in about 0.3 seconds and no appreciable secondary signal is experienced upon contact of the exploder 10 with the ground 11. The remainder of the travel time of the exploder 10 occupies as little as 0.6 seconds so that the apparatus described allows a single exploder 10 to operate on a time cycle of 0.9 seconds and a bank of six exploders can operate at a rate of one shot per 150 milliseconds.

At the beginning of the metered fluid flow into the cylinder 17, a substantial portion of the weight of the exploder 10 is more or less abruptly transferred to the support frame 14 and to any associated structure, for example, a truck frame suspension, tires, etc. Tests reveal, however, that the amplitude of the signal generated by this action can be made as low as 1/20 of that of the primary signal generated by the exploder 10. A secondary signal of this amplitude will not interfere significantly with the reflected seismic energy.

It may be desirable to vary the rate at which the fluid 22 is metered through the tube 44 as the piston 19 rises to its stop position against the detent 29. For example, a higher fluid flow rate can be used initially to lessen the shock of transition from the reservoir cylinder 18 to the reservoir cylinder 17 while this rate may be gradually reduced to essentially a zero value to coincide with the return of piston 16 to its start position and the instant of impact of exploder 10 against the earth 11. Those skilled in the art will have no difficulty in selecting any of various well-known means for progressively decreasing this rate such as by restricting the effective diameter of the metering tube 44 as the piston 19 travels upward.

When the piston 19 reaches the detent 29, further fluid flow ceases and the piston 16 will again be at rest adjacent the bottom of the cylinder 12. Howver, if the earth has been compacted by the shot, the exploder 10 may be held above ground by the rod 15 when the piston 16 returns to this rest position. In that event, the piston 16 will support some or all of the weight of the exploder 10 and pressure will built up in the fluid system. A flexible diaphragm 46 integral with the conduit 21 is sensitive to this pressure buildup so as to be urged outwardly causing an actuator button 47 to close back contact 50 of the dual limit pressure switch 51. This completes a circuit through a lead 53 to one set of windings in a reversing motor 54 causing its threaded shaft 55 to turn within the piston stop 33 so as to draw it upwardly. This enables the piston 20 to rise so that further fluid 22 can enter cylinder 18. The piston 16 falls correspondingly, thus lowering the exploder 10 into contact with the earth in a position to fire again. Fluid pressure will now drop sufficiently to cause the back switch contact 50 to open. The action of the switch 51 may be adjusted so that a major fraction, for example about 95%, of the weight of the exploder 10 is supported by the earth in the neutral position of the switch 51. This results in a minimum control pressure in the fluid 22, for example about 5 psi, at all times. If the weight of the exploder 10 is completely supported by the earth, the forward contact 56 of the switch 51 will complete a circuit to the motor through a lead 57 to a second set of motor windings so as to reverse the rotation of the shaft 53 and urge the piston 20 downwardly. This forces the fluid 22 from the cylinder 18 into the cylinder 12 beneath the piston 16 causing it to lift the exploder 10 until the preset fluid pessure is reestablished in the fluid 22. It will be a simple matter to provide means (not shown) overriding the switch 51 and adapted to operate the reversing motor 54 to lift the exploder 10 any suitable distance for transport purposes.

Within the scope of this invention, it may be desirable to modify the catcher cylinder 12 by pessurizing an enclosed volume of air in space 41 above the piston 16. Upward travel of the piston 16 will then compress this volume of air so that it acts as a source of stored energy adapted to accelerate the downward movement of the exploder 10 until the reservoir cylinder 18 is filled, thus further reducing the total rise and fall travel time of the device.

Applicant's invention should be understood to include a novel high speed method of catching a seismic gas exploder of the type which is adapted to rebound from the earth after imparting a downwardly directed pulse thereto. The steps of such a method include coupling the exploder to the piston of at least one hydraulic cylinder such that its piston is adapted to be driven by the rise and fall of the exploder, allowing the piston to travel essentially without restraint in one direction during the rise of the exploder to its maximum height and in an opposite direction during its subsequent fall under the influence of gravity until the exploder reaches a predetermined distance above the earth, and thereafter hydraulically damping the further motion of the piston in this opposite direction so as to slow the remaining descent of the exploder. In a preferred embodiment of this invention as described above, the method is practiced by coupling the exploder 10 to a hydraulic system wherein reservoir cylinders 17 and 18 are designed to empty sequentially into catcher cylinder 12 at the same rapid rate as exploder 10 moves freely upward and to refill in inverse order as exploder 10 falls to earth, first rapidly and then at a controllable slower rate.

It should be pointed out that while the apparatus of this invention has been described and illustrated in conjunction with a gas exploder having an earth-air interface in its rest position, there is no intent to so limit the operating context. It may, for example, be desirable to employ this invention in conjunction with a gas exploder which is normally suspended above the earth in its rest position and is driven downwardly to impact the ground. Some gas exploders can safely withstand this stress. Clearly the technique of applicant's invention may be of value in connection with the repetitive operation of such exploders. In that event, appropriate adjustment would be required in the setting of pressure switch 51 so that it would remain in a null position.

It should also be pointed out that although the invention has been described and illustrated with a certain degree of particularlity, it is understood that the present disclosure has been made only by way of example and that numerous changes in the details of construction and the combination and arrangement of parts may be resorted to without departing from the spirit and scope of the invention as hereinafter claimed.

What is claimed is:

1. An apparatus for controlling the rise and fall of a seismic gas exploder of the type adapted to apply a downwardly directed pulse to the earth and which is driven upwardly by the resultant reactive force comprising:
   a. a support structure,
   b. at least one hydraulic cylinder affixed to said support structure and having a piston movable therein,
   c. means for coupling said gas exploder to said piston so that said piston and said gas exploder are constrained to move together, and
   d. means for selectively damping the motion of said piston so that an initial portion of the fall of said exploder is unrestrained and a terminal portion of said fall is restrained and such that said initial portion of the fall of said exploder is of substantially greater length than said terminal portion.

2. Apparatus as in claim 1 including means responsive to the travel of said piston during the rise of said gas exploder to its maximum height for transferring energy to a storge device, and means for thereafter applying the energy from said storage device to accelerate the motion of said piston and said gas exploder during said initial portion of said fall.

3. Apparatus as in claim 1 wherein said gas exploder is dependently interconnected with said piston so that said gas exploder and said piston are in substantial axial alignment.

4. An apparatus for controlling the rise and fall of a seismic gas exploder of the type adapted to apply a downwardly directed pulse to the earth and which is driven upwardly by the resultant reactive force comprising:
   a. a support structure,
   b. at least one upstanding hydraulic cylinder affixed to said support structure and having a piston movable therein,
   c. means for interconnecting said piston and said gas exploder so that they are constrained to move together,
   d. means enabling said piston to move substantially without restraint in one direction during the rise of said gas exploder to its maximum height and in an opposite direction during a predetermined initial portion of the subsequent fall of said gas exploder, and
   e. means responsive to the completion of said initial portion of the fall of said gas exploder for thereafter applying a damping force to said piston adopted to slow the terminal portion of the fall of said gas exploder to its starting position.

5. Apparatus for controlling the travel of a seismic gas exploder of the type adapted to apply a downwardly directed pulse to the earth and which is driven upwardly by the resultant reactive force comprising:
   a. a support structure,
   b. at least one upstanding hydraulic catcher cylinder affixed thereto in substantial axial alignment with said gas exploder,
   c. a catcher piston movable within said hydraulic cylinder to which said gas exploder is dependently attached in integral relation,
   d. a hydraulic fluid reservoir inerconnected with said catcher cylinder below said catcher piston and adapted to continuously supply fluid to support said catcher piston during the upward travel thereof to its maximum height,
   e. means enabling said fluid to be freely expelled from said catcher cylinder and returned to said fluid reservoir responsive to the descent of said piston from said maximum height to a predetermined intermediate height above its starting position, and
   f. means for thereafter restricting the rate at which said fluid is expelled from said catcher cylinder into said reservoir responsive to the further descent of said piston to said starting position so that the corresponding downward motion of said gas exploder may be simultaneously slowed.

6. Apparatus as in claim 5 wherein the rest weight of said gas exploder is normally so distributed that a predetermined percentage of said weight is adapted to be supported by the earth, the remainder being supported by said catcher piston, and including means responsive to variation in said weight distribution for moving said piston in a direction to restore said distribution.

7. Apparatus as in claim 6 wherein means are provided responsive to variation in the fluid pressure corresponding to said predetermined weight distribution for transferring fluid between said catcher cylinder and said reservoir so that said catcher piston moves to restore said corresponding pressure.

8. Apparatus for controlling the travel of a seismic gas exploder of the type adapted to apply a downwardly directed pulse to the earth and which is driven upwardly by the resultant reactive force comprising:
   a. a fixed support structure,
   b. at least one upstanding hydraulic catcher cylinder mounted thereto in substantial axial alignment with said gas exploder,
   c. a catcher piston movable within said hydraulic cylinder to which said gas exploder is dependently attached in integral relation,
   d. a first and a second reservoir cylinder in fluid communication with said catcher cylinder below catcher piston,
   e. means for injecting fluid from said first and second reservoir cylinders into said catcher cylinder during the upward travel of said catcher piston at a rate sufficient for the unrestrained support thereof, and
   f. means enabling said first and second reservoir cylinders to refill from said catcher cylinder sequentially responsive to the descent of said catcher piston, the rate at which said second reservoir cylinder refills being restricted relative to said first reservoir cylinder so as to damp a selected portion of the descent of said catcher piston, whereby the corresponding downward motion of said gas exploder is slowed.

9. A method of catching a seismic gas exploder of the type which is adapted to apply a downwardly directed pulse to the earth from an initial position in contact therewith and which is driven upwardly to a maximum rebound height by the resultant reactive force comprising the steps of:
   a. coupling the gas exploder to the movable piston of a hydraulic cylinder so that said gas exploder and said piston are constrained to move together,
   b. allowing the piston to travel essentially without restraint in one direction responsive to the rise of the exploder to maximum rebound height and in an opposite direction responsive to the subsequent fall of said exploder under the influence of gravity through the substantially greater portion of its distance above the earth, and c. thereafter hydraulically damping the further motion of said piston so as to slow the rate of return of said gas exploder to its initial position.

10. A method of controlling the travel of a seismic gas exploder of the type adapted to apply a downwardly directed pulse to the earth and which is driven upwardly by the resultant reactive force comprising the steps of:
   a. guiding said gas exploder from starting position along a predetermined upright path without restraint during the rise thereof to its maximum height and during the initial fall thereof to a predetermined distance and above said starting postion,
   b. utilizing the completion of said initial fall to activate means for slowing the terminal portion of said fall to said starting position without transmitting a significant secondary pulse to the earth.

11. A method as in claim 10 wherein the rate of said fall is gradually decreased as said gas exploder approaches the earth.

12. A method of controlling the travel of a seismic gas exploder of the type adapted to apply a downwardly directed pulse to the earth and which is driven upwardly by the resultant reactive force comprising the steps of:
   a. guiding said gas exploder from a starting position in contact with the earth along a predetermined upright path during the rise and fall thereof,
   b. applying energy to a storage device responsive to the rise of said gas exploder to its maximum height,
   c. thereafter releasing such energy from said storage device to accelerate said gas exploder downwardly until it reaches a predetermined intermediate height above the earth, and
   d. applying a restraining force to said gas exploder responsive to the fall thereof to said predetermined intermediate height, whereby said gas exploder is returned to said starting position without transmitting a significant secondary pulse to the earth.

* * * * *